United States Patent [19] [11] 4,116,811
Schaefer et al. [45] Sep. 26, 1978

[54] METHOD OF SEPARATING ACTIVE HYDROGEN COMPOUNDS FROM HETEROGENEOUS MIXTURES ALSO CONTAINING COMPOUNDS WHICH DO NOT CONTAIN ACTIVE HYDROGENS

[76] Inventors: Hans-Georg Schaefer, Weberhof 17, D-5100 Aachen; Axel Vogts, Kapellenweg 13, D-5180 Eschweiler, both of Germany

[21] Appl. No.: 765,681

[22] Filed: Feb. 4, 1977

[51] Int. Cl.$^2$ .............................................. C10C 1/20
[52] U.S. Cl. .................................................... 208/44
[58] Field of Search .................................... 208/39, 44

[56] References Cited
U.S. PATENT DOCUMENTS 3,920,467  11/1975  Stewart et al. ........................ 208/44

FOREIGN PATENT DOCUMENTS 1,470,452  5/1969  Fed. Rep. of Germany ............. 208/44

Primary Examiner—O. R. Vertiz
Assistant Examiner—Wayne A. Langel
Attorney, Agent, or Firm—Diller, Brown, Ramik & Wight

[57] ABSTRACT

Organic compounds having active hydrogen are separated from heterogeneous mixtures of organic compounds, such as tar, which also contain organic compounds which do not have active hydrogen. The method involves preferential conversion of the active hydrogen compounds to soluble compounds by reaction with a reagent which is an alkene oxide or ethyleneimine, introducing a solvent for the soluble compounds whereby two phases are formed, and then separating the phases.

18 Claims, No Drawings

METHOD OF SEPARATING ACTIVE HYDROGEN COMPOUNDS FROM HETEROGENEOUS MIXTURES ALSO CONTAINING COMPOUNDS WHICH DO NOT CONTAIN ACTIVE HYDROGENS

BACKGROUND OF THE INVENTION

This invention relates to a method of separating at least one organic substance having active hydrogen from a mixture of organic compounds which contains said one compound and other organic compounds which do not have active hydrogen.

Among the most important mixtures of the above type are the various tars such as bituminous coal tar, lignite tar, bituminous coal tar asphalt and the like. Tars usually contain mixtures of various organic compounds, including alkanes, olefins, aromatics, creosotes and the like which have active hydrogen, as well as organic compounds which do not have active hydrogen. The materials having active hydrogen are fairly toxic and may be carcinogenic and, as well, may contribute to the occurrence of undesired secondary reactions in the mixture. For example, crude tar will alter its properties in a short period of time even at low temperatures due to these secondary reactions.

It is known, of course, to separate individual substances or groups of substances from a tar mixture by means of fractional distillation or by solvent extraction.

When applying the distillation process, large amounts of distillation residues are formed in the tar, mostly on account of secondary reactions, and these residues can only be used for economical applications in extreme exceptions. They are therefore considered as operationally expensive wastes.

The cracking products arising from distillation also strongly affect the degree of purity of the distillation products obtained, which thereby suffer from very restricted applicability. Lastly, the distillation method requires much heat and therefore is costly.

Again, the extraction process too is beset with drawbacks. An appreciably amount of equipment is required on account of the large flow of solvents. This process furthermore is a great stress on the ecology.

In order to obtain clean individual substances, the groups of materials separated by extraction must be subjected to a further separation, thereby involving additional difficulties, extra procedures and equipment cost.

Similar conditions also apply to other homogeneous and heterogeneous mixtures of materials some of which contain active hydrogen.

BRIEF SUMMARY OF THE INVENTION

This invention is concerned with a method of treating mixtures as described above whereby the organic compounds having active hydrogen are caused to react, in situ, with a reagent which preferentially reacts with them to produce soluble compounds. These soluble compounds may be water soluble or soluble in other solvents such as benzine. The mixture in which said preferential reaction has been effected is then contacted and mixed with a solvent for the soluble compounds formed, whereby two phases are formed. These two phases are then separated.

The reagent employed may be an alkene oxide, preferably ethylene oxide, or it may be ethyleneimine. The reagent may be introduced directly or it may be caused to form in the mixture, i.e., by dissociation of ethylene carbonate.

In this manner, tars — for instance low-temperature carbonization lignite tar, high-temperature lignite tar, bituminous coal tar, petroleum products or bitumins of oxosynthesis products essentially consisting of pure CH compounds and of CH compounds with hetero-atoms — may be separated. It is precisely the CH compounds with hetero-atoms that in tar distillation cause the interfering secondary reactions.

One implementation of the invention consists in reacting the mixture of materials with ethylene oxide or with ethyleneimine and in separating by means of water the previously insoluble substance which now becomes water-soluble. Ethylene oxide may be added in any arbitrary amounts to any compound comprising active hydrogen. The water-solubility of the soluble compound formed depends on a sufficient content of ethylene oxide.

It is possible, in the case under consideration, to separate the mixture of materials, for instance tar, into two groups of substances, by reacting the active hydrogen of one of the groups with ethylene oxide. A syrupy liquid is obtained in this problem-free so-called ethoxylation, for instance of tar, which may be easily separated by water extraction. Precisely those materials then dissolve in water which in distillation would occur as interfering factors.

The water-insoluble part remains on the water in the form of an oily liquid and may be separated directly. This part essentially consists at that stage only of pure CH compounds which are aromatic, aliphatic or alicyclic, depending on the nature of the tar.

The water-soluble parts simultaneously have been appreciably detoxified by the ethoxylation and may either be utilized for some practical, economical purpose, for instance as surfactants, or binders when briquetting bituminous coal or lignite, or else they may be immediately cleared biologically, such clearing no longer being interfered with by the tar products because of the feasibility of fully dissociating the ethoxylated ingredients.

When the method of the invention is applied to tar, further advantages obtain with respect to improving the storage life, i.e., the stability of that tar. Untreated crude tar will alter its properties in a short time even at low temperatures. While there are a number of experiments and publications with the object of tar stabilization, the ways previously followed however differ from that of the present method.

In particular, the application of the process of the invention to tar is of special economic significance. Because of the difficulties attending petroleum supplies, tars which so far have been obtained only as waste products now are being considered valuable raw products. Economical utilization of such raw materials requires their conversion into useful ingredients under economical conditions.

Ethylene oxide representing a significant shipping risk on account of its low boiling point, and because furthermore it can react with the mixture of materials only if under pressure, further implementation of the invention proposes adding ethylene carbonate to the aforesaid mixture of materials, further raising the mixture's temperature to at least 140° C., and reacting the ethylene oxide released from the ethylene carbonate following dissociation of carbon dioxide ($CO_2$) with this mixture of materials.

Ethylene carbonate splits off carbon dioxide when heated to at least 140° C. and is converted into ethylene oxide:

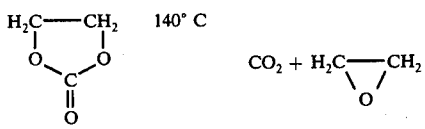

Since ethylene carbonate is a good solvent, it may be mixed with the tar mixture to form a liquid. This liquid may be stored easily since the high boiling point of ethylene carbonate avoids the necessity for cooled, pressure storage vessels as would be the case with the use of ethylene oxide directly. Moreover, the liquid may be formed at one site and shipped to another site for reaction and separation according to this invention. The use of ethylene carbonate is also especially attractive because the formation of liquid due to the solvent action of ethylene carbonate allows an increased rate of reaction when the reaction is initiated and also, since the ethylene oxide which is released will always be present in dilute form, the possibility of explosion is greatly reduced. Furthermore, because the dissociation temperature of ethylene carbonate is much lower than its boiling point, the reaction may take place at atmospheric pressure.

DETAILED DESCRIPTION OF INVENTION

Illustrative of the reactions which take place between the reagent and the compounds having active hydrogen are the following:

1. RCOOH (active hydrogen compound) +
   (ethylene oxide)$_n$ $\longrightarrow$
   R—C—O—(—CH$_2$—CH$_2$—O—)$_n$—H
   (water soluble compound).

2. RCOOH + (ethyleneimime)$_n$ $\longrightarrow$
   R—C—O—(—CH$_2$—CH$_2$—N—)$_n$—H
   (water soluble compound).

3. RCOOH + ethylene carbonate $\longrightarrow$
   $$\text{R}-\overset{\overset{\text{O}}{\|}}{\text{C}}-\text{O}-(-\text{CH}_2-\text{CH}_2-\text{O}-)_n-\text{H}$$
   (water soluble compound) + CO$_2$ In the following examples 1–6, a weighed amount of tar or of residue from lignite tar semi-solid phase hydrogenation containing less than 1% water is added to a 2-liter stirrer autoclave equipped with heater, thermometer and metering. The autoclave is heated until reaching the tar's melting point, and the reaction vessel is purged through the reagent metering device with nitrogen until an oxygen-free atmosphere is obtained. Thereupon the temperature of the autoclave is raised to 150° C. and nitrogen is introduced until a pressure of 5 bars is obtained. A given amount of reagent is then added in such manner that the temperature of reaction does not exceed 170° C. After all of the reagent has been made to react, the autoclave is allowed to cool and the still liquid reaction products are withdrawn at 60° C.

The reaction mixtures withdrawn from the autoclave are introduced into a 5-liter beaker containing 1 liter of hot water between 70° and 80° C. The mixture is stirred at this temperature for about 15 minutes, whereby the reaction mixture becomes distributed throughout the water. The stirrer is shut off after the period of stirring, whereupon one waits until the substances have separated into two phases. The reaction products which contained active hydrogens now are in the aqueous solution, whereas the water-insoluble phase — which floats on top as an oily liquid — as a rule contains mostly pure hydrocarbons. The two phases then are separated by any desired known method.

EXAMPLE 1 conversion of bituminous coal tar with ethylene oxide; initial product 700 gm of bituminous coal tar, reagent; 200 gm of ethylene oxide.

EXAMPLE 2 conversion of lignite tar with ethylene oxide; initial product; 750 gm of low-temperature carbonized lignite tar; reagent; 220 gm of ethylene oxide.

EXAMPLE 3 conversion of bituminous coal tar asphalt with ethylene oxide; initial product: 1000 gm of bituminous coal tar asphalt, reagent: 220 gm of ethylene oxide.

EXAMPLE 4 conversion of bituminous coal tar with ethyleneimine (aziridine); initial product: 700 gm of bituminous coal tar, reagent: 215 gm of ethyleneimine.

EXAMPLE 5 conversion of lignite tar with ethyleneimine (aziridine); initial product: 750 gm of low-temperature carbonized lignite tar, reagent: 215 gm of ethyleneimine.

EXAMPLE 6 conversion of bituminous coal tar asphalt with ethyleneimine (aziridine); initial product: 1000 gm of bituminous coal tar asphalt, reagent: 215 gm of ethyleneimine.

In the following examples 7–9, the same procedure outlined above is followed except that the pressure in the autoclave is atmospheric.

EXAMPLE 7 conversion of bituminous coal tar with ethylene carbonate; initial product: 700 gm of bituminous coal tar, reagent: 400 gm of ethylene carbonate.

EXAMPLE 8 conversion of lignite tar with ethylene carbonate; initial product: 750 gm of low-temperature carbonized lignite tar, reagent: 440 gm of ethylene carbonate.

EXAMPLE 9 conversion of bituminous coal tar asphalt with ehtylene carbonate; initial product: 1000 gm of bituminous coal tar asphalt, reagent: 440 gm of ethylene carbonate.

The process of the invention also is suited for reacting heterogeneous materials with active hydrogens, when these materials are not tars. A few examples will be listed, the procedure in examples 10 and 11 being the same as outlined for examples 1–6 and that for example 12 being the same as for examples 7–9:

EXAMPLE 10 conversion of hydrogenated lignite tar from the semi-solid phase hydrogenation by means of ethylene oxide; initial product: 750 gm of residue from the semi-solid phase hydrogenation of lignite tar; reagent: 220 gm of ethylene oxide.

EXAMPLE 11 conversion of hydrogenated lignite tar from the semi-solid phase hydrogenation by means of ethylene oxide; initial product: 750 gm of residue from the semi-solid hydrogenation phase of lignite tar, reagent: 215 gm of ethyleneimine.

EXAMPLE 12 conversion of hydrogenated lignite tar from the semi-solid phase hydrogenation by means of ethylene oxide; initial product: 750 gm of residue from the semi-solid phase hydrogenation of lignite tar, reagent: 440 gm of ethylene carbonate.

A survey of the aforesaid examples is shown in tabular form below:

| Initial Product | Amount | Reagent | Amount |
|---|---|---|---|
| lignite tar | 700 gm | ethylene oxide | 200 gm |
| low-temperature carbonized ignite tar | 750 | " | 220 |
| bituminous coal tar asphalt | 1000 | " | 220 |
| hydrogenation residue | 750 | " | 220 |
| bituminous coal tar | 700 | ethyleneimine | 215 |
| lignite tar | 750 | " | 215 |
| bituminous coal tar asphalt | 1000 | " | 215 |
| hydrogenation residue | 750 | " | 215 |
| lignite tar | 700 | ethylene carbonate | 440 |
| low-temperature carbonized lignite tar | 750 | " | 440 |
| bituminous coal tar asphalt | 1000 | " | 440 |
| hydrogenation residue | 750 | " | 440 |

In order to reduce the secondary reactions or dissociation which may occur even at the relatively low temperatures specified above, the reaction tempeature may be lowered to 120° C. by adding sodium phenate ($C_6H_5ONa$) or sodium ethylate ($C_2H_5ONa$) to the tar or other mixture prior to heating in the autoclave.

The reactions with ethylene carbonate may also be advantageously carried out in open stirring vessels.

All the aforesaid examples induced the previously insoluble substances contained in the tar to become water-soluble compounds.

In those cases when this is undesired on specific grounds, for instance to save the energy required to eliminate the water, there is the feasibility of making use in similar manner of another epoxide, for instance propylene oxide in lieu of ethylene oxide. In such a case the previously insoluble substance may be dissolved by a solvent, preferably benzine, in lieu of water.

What is claimed is:

1. The method of treating a heterogenous mixture of organic compounds, which mixture comprises at least one organic compound which does not have active hydrogen and at least one other organic compound which does have active hydrogen, which comprises the steps of:
   (a) contacting said mixture with a reagent which reacts with said other compound to form a soluble compound, said reagent being selected from the group consisting of alkene oxides and ethyleneimime;
   (b) introducing a solvent for said soluble compound into said mixture to form two phases therein; and then
   (c) separating said phases from each other.

2. The method as defined in claim 1 wherein said reagent is ethylene oxide and wherein the contacting of step (a) is effected by introducing ethylene carbonate into said mixture and heating the mixture to dissociate said ethylene carbonate to release carbon dioxide therefrom and form said ethylene oxide.

3. The method as defined in claim 1 wherein said reagent is propylene oxide.

4. The method as defined in claim 3 wherein said solvent is benzine.

5. The method as defined in claim 1 wherein said reagent forms a water soluble compound with said other organic compound and the solvent introduced in step (b) is water.

6. The method as defined in claim 5 wherein said reagent is ethylene oxide.

7. The method as defined in claim 5 wherein said reagent is ethyleneimine.

8. The method of recovering organic compounds having active hydrogen from a mixture which also contains organic compounds which do not have active hydrogen, which comprises the steps of:
   (a) heating said mixture to its melting point and introducing an amount of a reagent selected from the group consisting of ethylene oxide, ethylene imine and propylene oxide sufficient to react with said organic compounds having active hydrogen and form soluble compounds;
   (b) introducing a solvent for said soluble compounds into said mixture to form two phases; and then
   (c) separating said phases from each other.

9. The method as defined in claim 8 wherein said reagent is ethylene oxide and said reaction is carried out at a temperature of at least about 140° C. under a pressure greater than atmospheric.

10. The method as defined in claim 8 wherein said reagent is ethyleneimine and said reaction is carried out at a temperature of at least about 140° C. under a pressure greater than atmospheric.

11. The method as defined in claim 8 wherein said reagent is ethylene oxide and is introduced by contacting the mixture with ethylene carbonate and maintaining such mixture at a temperature sufficient to dissociate said ethylene carbonate into carbon dioxide and ethylene oxide at atmospheric pressure.

12. The method as defined in claim 8 wherein said mixture is crude tar.

13. The method as defined in claim 8 wherein said mixture is bitumen.

14. The method as defined in claim 8 wherein said mixture is the residue from semi-solid phase hydrogenation of lignite tar.

15. The method of treating a material selected from the group consisting of bituminous tars and asphalts, which comprises the steps of:
   (a) heating said material to its melting point and reacting it with a sufficient amount of reagent selected from the group consisting of ethylene oxide and ethyleneimine and for a time sufficient to form a liquid reaction mixture consisting of two organic fractions, one of which is water soluble and the other of which is water insoluble;
   (b) contacting said liquid reaction mixture with a sufficient amount of water to dissolve said water soluble organic fraction and allowing the mixture to separate into a dissolved organic fraction layer and a water insoluble organic fraction layer; and then (c) separating said layers from each other.

16. The method defined in claim 15 wherein said material is selected from the group consisting of bituminous coal tar, lignite tar, bituminous coal tar asphalt and hydrogenated lignite tar.

17. The method of treating a material selected from the group consisting of bituminous tars and asphalts, which comprises the steps of:

(a) heating said material to its melting point and reacting it with a sufficient amount of propylene oxide and for a time sufficient to form a liquid reaction mixture consisting of two organic fractions, one of which is soluble in benzine and the other of which is insoluble in benzine;

(b) contacting said liquid reaction mixture with a sufficient amount of benzine to dissolve said one fraction and allowing the mixture to separate into a dissolved organic fraction layer and a benzine insoluble layer; and then (c) separating said layers from each other.

18. The method defined in claim 17 wherein said material is selected from the group consisting of bituminous coal tar, lignite tar, bituminous coal tar asphalt and hydrogenated lignite tar.

* * * * *